C. DEADERICK.
Vehicle Wheel.
No. 201,873. Patented April 2, 1878.
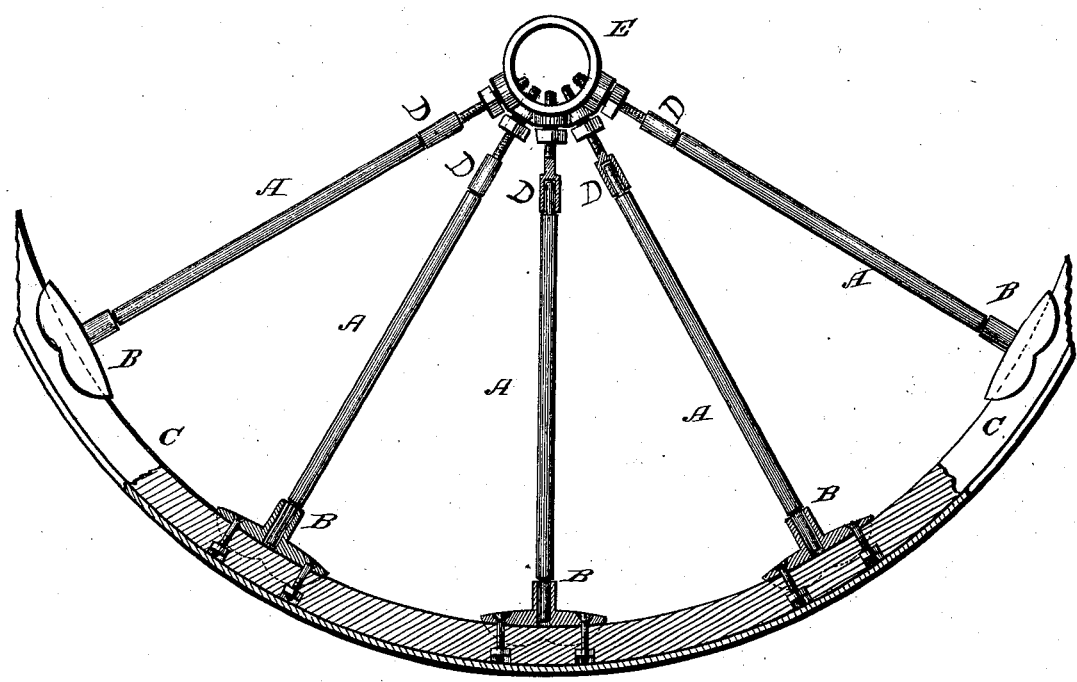

UNITED STATES PATENT OFFICE.

CHALMERS DEADERICK, OF KNOXVILLE, TENNESSEE.

IMPROVEMENT IN VEHICLE-WHEELS.

Specification forming part of Letters Patent No. 201,873, dated April 2, 1878; application filed January 17, 1878.

*To all whom it may concern:*

Be it known that I, CHALMERS DEADERICK, of the city of Knoxville, in the county of Knox and State of Tennessee, have invented a new and useful Improvement in Vehicle-Wheels, which improvement is fully set forth in the following specification and accompanying drawing, in which—

A represents the spokes; B, the spoke-sockets; C, the felly; D, the ferrule or socket, terminating in a screw; and E, the hub-band.

The object of my invention is to furnish a removable spoke, which at any time may be taken from the wheel and replaced, or like ones substituted in case of accident, without disturbing the felly or tire or removing the socket from the felly. This socket I will hereinafter more particularly describe. In the event of loosening of spoke, felly, or tire by reason of expansion or contraction of either, the tightening or binding efficacy may be effected by screwing the spokes outward from the hub, so as to press the felly or rim securely against the tire.

The spokes are made of wood, as also the hub, which is provided with a cast-steel band, E, with suitable holes, through which to screw the spokes into the hub.

My spokes are made with an iron ferrule or socket, terminating with a screw. This ferrule or socket is placed securely and fixedly on the hub end of the spoke. The felly end of the spoke is made to fit smoothly and tightly into the spoke-socket. This socket is connected with, and is a part of, a plate which rests on the felly, and is attached thereto by bolts put through the felly from the inner side, and their nuts countersunk from the outer side, so as not to interfere with the tire; or the bolts may be reversed.

To insert the spoke, the screw or hub end of the spoke is provided with a nut. The spoke must be of such length as to reach exactly from the hub to the inner surface of the felly; screw the spoke about three-quarters of an inch into the hub; put the spoke-socket in position, and fasten it to the felly. Its inner surface will then be raised just three-quarters of an inch from the felly, and the outer end of the spoke will barely reach it. Then turn into the socket firmly, screwing it from the hub. Then screw the nut up to the hub, and the spoke is adjusted. Screwing the nut up to the hub affords additional tightness and security to the spoke.

To remove the spoke, loosen the nut and unscrew from the hub.

I am aware that a removable spoke is old; but

What I claim as new, and desire to secure by Letters Patent, is—

The combination, in a vehicle-wheel, of a removable spoke, A, having socket B and ferrule or socket D, terminating in a screw having a nut, substantially as set forth, and for the purposes specified.

CHALMERS DEADERICK.

Witnesses:
J. M. KING,
C. McCLUNG.